March 27, 1934.      R. E. KINKEAD      1,952,502
APPARATUS FOR COATING WIRE
Filed May 31, 1930
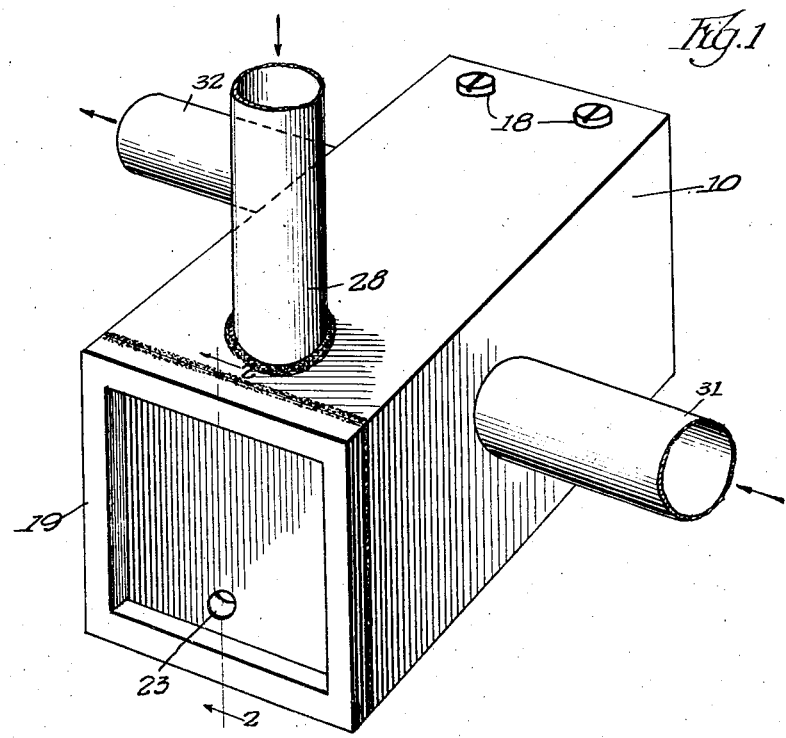
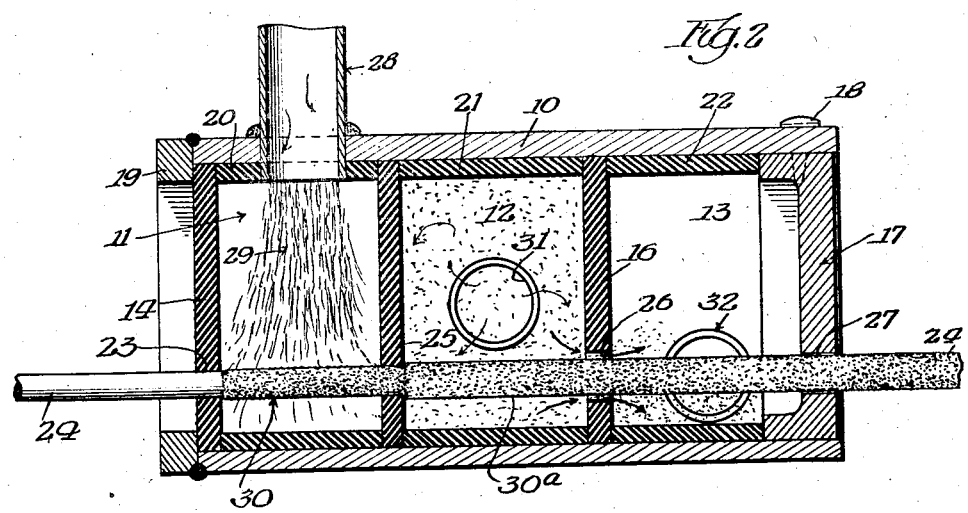
Inventor
Robert E. Kinkead Patented Mar. 27, 1934

1,952,502

UNITED STATES PATENT OFFICE 1,952,502

APPARATUS FOR COATING WIRE

Robert E. Kinkead, Cleveland, Ohio, assignor, by mesne assignments, to Una Welding Inc., Cleveland, Ohio, a corporation of Delaware Application May 31, 1930, Serial No. 458,223

1 Claim. (Cl. 91—45)

This invention relates to improvements in an apparatus for and a method of applying coatings such as flux carrying coatings to electric arc welding wire or rods.

Heretofore various methods have been employed to apply the coating and to have it adhere to the welding wire or rod between the time it is manufactured and the time that it is used.

A common method has been to employ a binder of such substance as sodium silicate which holds the lime or other materials of the flux or coating in suspension until it is applied to the rod or wire and then hardens to such an extent as to serve the purpose of keeping the coating on the rod or wire.

This method and other similar ones involve running the rod through the mixture of coating material and binder, then putting the rod through a straightening and cutting machine. The operation of straightening and cutting tends to remove the covering previously applied to the wire or rod so that the welding wire or rod produced is of uneven quality.

One method of eliminating the difficulty consists of straightening and cutting the wire or rod into predetermined lengths and then dipping them in the mixture of sodium silicate and the covering material. While good results have been produced with this method, the practice is objectionable because such dipped rods have a thicker coating at the lower end, which is the last to leave the dip and is hung in a downward position while drying.

The use of sodium silicate as a binder is objectionable because when it hardens, it becomes very brittle. This would not be particularly objectionable but for the fact that welding operators, in many cases, must bend the welding rod or wire to meet the requirements of a particular welding operation. In these circumstances, the covering breaks or falls off, therefore failing to serve the purpose for which it was applied.

It is one of the objects of the present invention to overcome all of these difficulties and objections and to provide a coating or covering for rods or wire of this character which will permit the operator to bend the rod or wire without danger of breaking off the covering and at the same time possess all of the attributes of other rods or wire of this character.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which there is shown a simple form of apparatus by means of which this method may be carried into operation.

Figure 1 is a perspective view of an apparatus suitable for this purpose.

Figure 2 is a vertical, sectional view taken on line 2—2, Figure 1.

Referring more particularly to the drawing, there is shown a casing designated generally by the reference numeral 10 of any desired size and configuration, and which casing is closed and divided into separate compartments or chambers 11, 12 and 13, three of such compartments being here shown, but it is to be understood that any desired number of compartments may be used, suitable for the purpose.

The compartments are preferably formed by providing a series of partitions 14, 15 and 16, the partition 14 forming one end of the casing and the other end of the casing is formed by an end member 17, the latter being secured in position in any suitable manner, such as by means of suitable fastening devices 18. The partition 14 preferably rests against a flanged or annular end member 19.

Intermediate the partitions 14, 15 and 16 are spacing members 20 and 21 and a spacing member 22 is arranged intermediate the partition 16 and the end member 17, these spacing members 20—21—22 being annular and engaging the partitions only adjacent the peripheral portions thereof.

The partitions 14 may be formed of any suitable material, but in practice it has been found that stiff rubber packing material is suitably adapted for the purpose.

The partition 14 is provided with an opening 23 therethrough which is preferably of a size only slightly larger than the external diameter of the wire or rod 24.

The partition 15 is provided with an opening 25 therethrough in alinement with the opening 23 and is preferably of a diameter slightly larger than the diameter of the opening 23.

The partition 16 is provided with an opening 26 therethrough which is in alinement with the openings 23 and 25 but is of a diameter considerably larger than the diameter of the opening 25 in the partition 15, while the end member 17 is provided with an opening 27 therethrough which is in alinement with the openings 23, 25 and 26. The diameter of the opening 27 is considerably less than the diameter of the opening 26. These openings 23, 25, 26 and 27 being arranged in alinement will permit the rod or wire 24 to pass therethrough while moving through the casing 10.

Leading into the compartment 11 is an inlet pipe 28 through which binding material 29 is admitted preferably by gravity, although it may be supplied in any other suitable manner. The binder 29 is formed of any suitable material but a simple and efficient composition for the purpose has been found to be composed of gum such as rubber or any other suitable material dissolved in any suitable solvent, or if desired any other suitable adhesive or binder may be employed.

As the wire 24 passes through the compartment 11 the binder 29 will be deposited thereupon, with the result that the rod or wire will be coated as indicated by the reference character 30 and the excess material deposited thereon will be removed from the rod or wire as it passes through the opening 25 in the partition 15.

The rod or wire then passes into the chamber 12 where it is brought into contact with a blast of air ladened with any suitable dry and powdered material, the same being admitted into the chamber 12 through an inlet pipe 31.

The powdered material being supplied to the chamber 12 will be deposited upon the binder on the rod or wire and will adhere thereto, with the result that a certain or definite and perfectly uniform amount of the dry coating 30a will adhere to the tacky surface formed by the binder upon the rod or wire.

As soon as this tacky surface is covered with the dry material of the coating, no more of such material will adhere to the rod or wire.

The application of this powdered material to the rod necessarily increases the diameter of the rod and therefore the diameter of the opening 26 in the partition 16 is larger than the opening 25 in the partition 25, so that when the rod or wire with the coating adhering thereto passes out of the chamber 12 into the chamber 13, through the opening 26, the coating will not be scraped from the rod.

From the chamber 12 the rod or wire passes into the chamber 13 which is a collecting chamber, from which the excess material carried by the air blast will be discharged through an exhaust outlet 32 from which outlet the excess material which will not adhere to the rod or wire may be recovered.

The rod or wire which will then be completely coated will pass through the opening 27 in the end member 17, after which the same may be coiled upon reels or cut into desired lengths.

The opening 26 is of such a size as to insure an intimate contact of the air blast through the inlet opening 31 with the rod or wire so that the adhering properties of the tacky surface of the rod or wire will be completely satisfied, thus insuring that the covering or coating will be uniformly applied to the rod or wire as the ladened blast will be directed against the rod or wire as it is traveling through the chambers 12 and 13 and also through the opening 26.

With this improved method and apparatus it will be manifest that the rod or wire will be continuously fed through the apparatus and the process of applying the coating thereto will also be continuous.

While the preferred form of apparatus for carrying this method into operation has been shown and described and the preferred method has also been described, it is to be understood that various changes may be made in the details of construction and the combination and arrangement of the several parts of the apparatus and of the different steps in carrying the method into operation, within the scope of the claim, without departing from the spirit of this invention.

What is claimed as new is:

As a unitary structure an apparatus for coating welding wire or rods consisting of a casing, partitions dividing the casing into separate chambers, there being openings through the partitions in alinement with each other and through which openings the wire passes from one chamber directly to the other, means for depositing a binding material upon the wire as it passes through one of the chambers, means for discharging into another of the chambers a blast of air ladened with a powdered coating material, to be deposited upon the wire or rod as it moves through the last said chamber, another of the chambers constituting a collecting chamber, and means for removing excess material from the collecting chamber, the opening in the partition between the blast and collecting chamber being of a diameter considerably larger than the diameter of the coated rod or wire whereby the powder ladened blast of air will flow into the collecting chamber around the rod or wire as it passes through the last said partition.

ROBERT E. KINKEAD.